Nov. 30, 1965  J. O. S. BRUNDIN ETAL  3,220,088
TURN CUTTER WITH CONCAVE BASE SURFACES
AND A HOLDER FOR SUCH A CUTTER
Filed Feb. 26, 1962  3 Sheets-Sheet 2
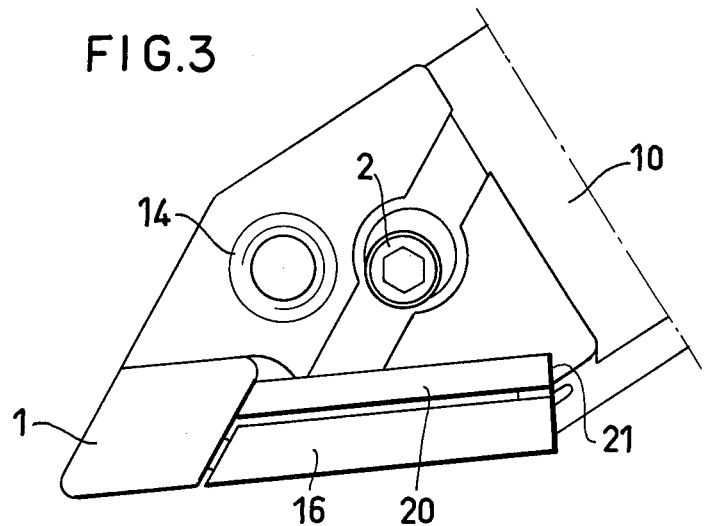
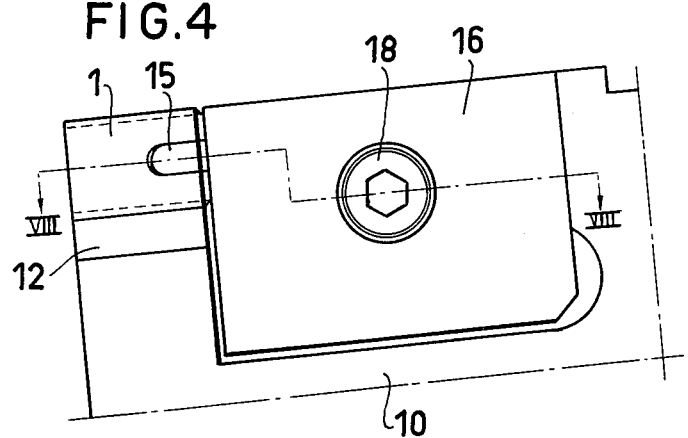
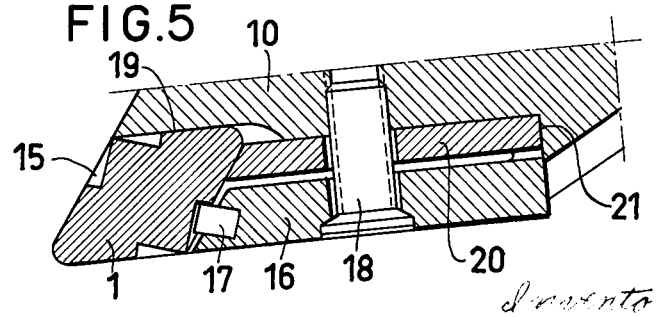

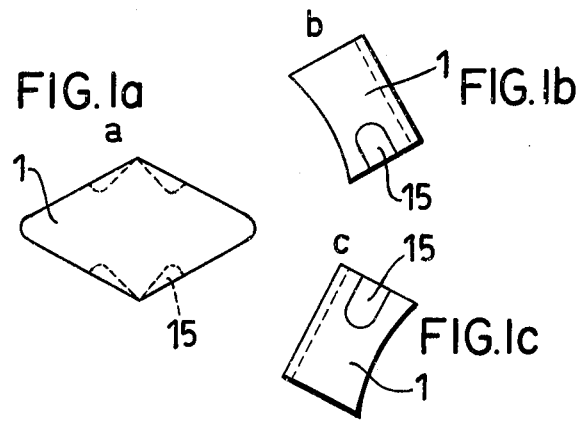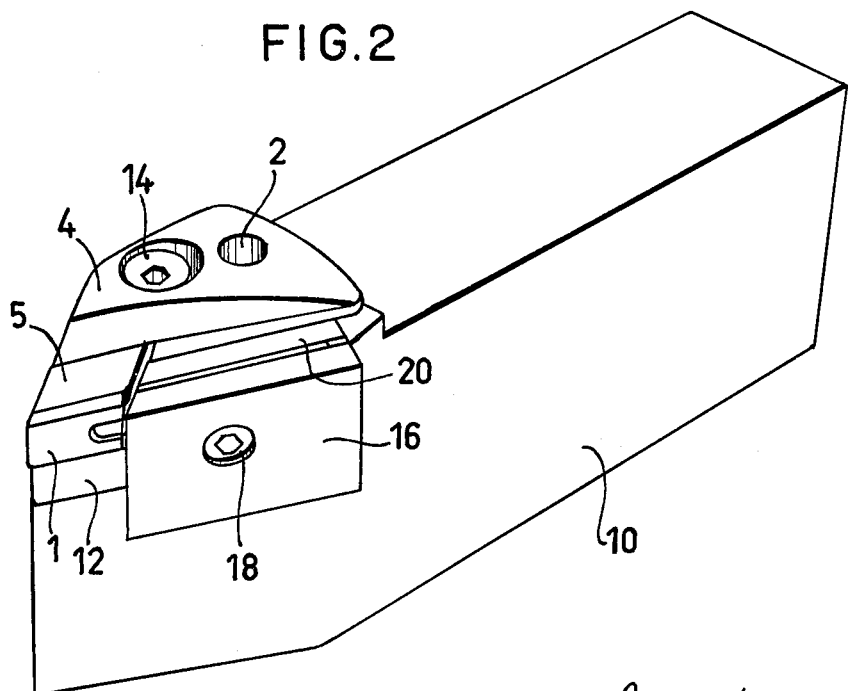

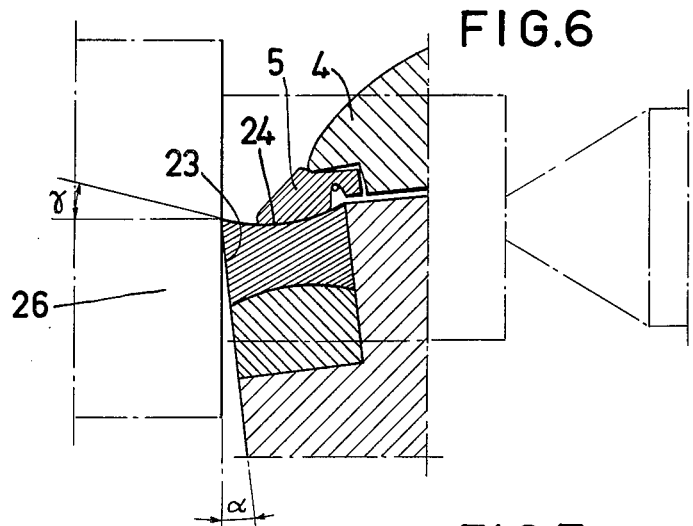
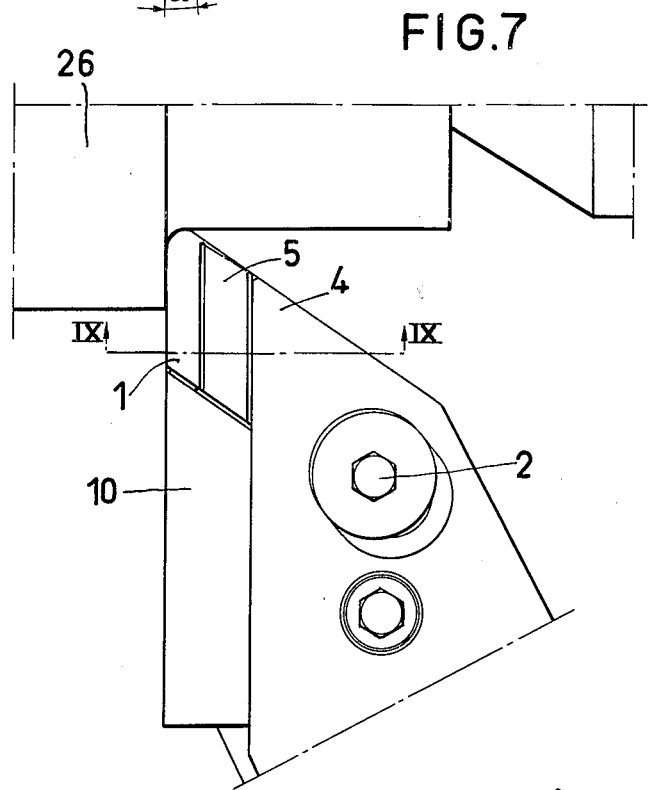

United States Patent Office 3,220,088
Patented Nov. 30, 1965

3,220,088
TURN CUTTER WITH CONCAVE BASE SURFACES AND A HOLDER FOR SUCH A CUTTER
John Olof Sigvard Brundin and Manfred Wallace Gustafson, Fagersta, Sweden, assignors to Fagersta Bruks Aktiebolag, Fagersta, Sweden, a Swedish joint-stock company
Filed Feb. 26, 1962, Ser. No. 175,551
Claims priority, application Sweden, Dec. 13, 1961, 12,465/61
2 Claims. (Cl. 29—96)

This invention relates to a cutter having a bit made of high speed tool steel, hard metal, ceramic material or the like, adapted, in use, to be detachably mounted on a tool holder for turning or other metal cutting work. The cutting edges are formed by the edges between the two base surfaces of the cutter and its lateral surfaces, the said cutting edges being worked successively. By turning the cutter bit, the edges of both of its base surfaces can be utilized. Cutters of this construction are called turn cutters. It is known to give the base surfaces of the turn cutter concave shape rendering the turn cutter capable of producing in all positions of application a positive rake angle ($\gamma$) and at the same time to produce a suitable clearance angle ($\alpha$). This invention relates to a turn cutter of the aforesaid type.

The invention includes a holder for the cutter bit according to the invention, the holder being characterized in that it is provided with a soleplate adjusted to the prismatic or cylinder-like concaveness of the cutter, against which soleplate the cutter is intended to be pressed.

The said two base surfaces of the cuter are preferably so shaped, that their concaveness is arranged crosswise in relation to one another. Due to the fact that the lower base surfaces of the cutter bit fit into the prismatic (cylindrical) sole of the holder as described above, the said sole participates in receiving the feed pressure during the metal cutting work and thereby counteracts the rotation of the cutter.

The said rotation of the cutter can now be counteracted in a more effective manner in that the cutter bit is provided with recesses, preferably in the clearance faces, and that such a recess is adapted to cooperate with means projecting from a clamping mechanism which holds the cutter, the said means being arranged to engage with the recess in such a manner, that the cutter bit is pressed toward two supporting surfaces of the holder. The cutter bit is preferably provided with four of such recesses, a lateral clamping piece being preferably arranged to have a pin projecting therefrom to engage with one of the said recesses. A tightening means, for example a lateral turnscrew, may be provided to act on the lateral clamping piece and the pin in such a manner, that the two latter press the cutter bit against the said supporting edge.

The invention is described in greater detail in the following, reference being had to the accompanying drawings showing by way of example some different embodiments of the invention.

FIGS. 1a, 1b, and 1c show diagrammatically in three projections an example of a cutter bit provided with recesses in its clearance faces.

FIG. 2 is a perspective view of a tool substantially intended for copying turning with a cutter according to FIGS. 1a, 1b and 1c.

FIGS. 3 and 4 show the same tool seen from above and from the side respectively, the clamp and its turnscrew and lifting spring being dismantled.

FIG. 5 shows a section along the line V—V in FIG. 4.

FIG. 6 is a sectional view on the line VI—VI of FIG. 7.

FIG. 7 is a plan view of a cutter bit according to FIG. 2 mounted on its holder as in use for turning a workpiece.

Referring to FIGS. 1a, 1b and 1c, the cutter is designated by numeral 1.

In FIGS. 2 and 3 the shank of the tool holder is designated by 10 and the rhombic cutter bit resting on a sole 12 by 1. The cutter is provided in its clearance faces with four recesses 15. In one of the said recesses engages a pin 17 projecting from a lateral clamping piece 16, which pin is preferably made of hard metal. When tightening a lateral turnscrew 18, the cutter bit 1 is pressed with the help of the pin 17, FIG. 5, against a supporting surface 19 on the handle 10. For fixing the cutter 1, there is provided a lateral support 20 secured to the handle 10 of the tool holder by means of two countersunk screws (which in FIGS. 2 and 4 are invisible due to the lateral clamping piece 16), the said support 20 at its rear edge abutting against a surface 21 projecting from the said handle. Numeral 14 designates an eccentric means for variable displacement of the clamp 4 and cutting breaker 5 in a direction perpendicular to the cutting edges.

FIG. 2 shows further a clamp 4 with a clamping screw 2 and a cutting breaker 5 which are assumed removed in FIGS. 3–5.

In FIGS. 6 and 7 a work-piece 26 is included. Furthermore, the clearance angle $\alpha$ and the rake angle $\gamma$ are marked.

What we claim is:

1. A cutting tool comprising a holder having a first bit-supporting surface, a second bit-supporting surface disposed at an angle to said first surface, a cutter bit disposed in the angle between said two bit-supporting surfaces and adapted to be turned and tilted into adjusted working positions with respect to said surfaces, said bit having a plurality of cutting edges for selective use, a clamping member located adjacent said bit on the side thereof toward said second surface, said bit being provided with a recess in its side toward said clamp, said clamp having a projection extending into said recess angularly inwardly in the direction of said first surface, and means for pressing said clamp toward said first surface whereby said projection presses said bit toward said first bit-supporting surface, and due to its angular direction of extent, also draws said bit toward said second bit-supporting surface, said holder being provided with a third bit-supporting surface arranged at an angle to each of said two other bit-supporting surfaces, and a second clamping means pressing said bit toward said third surface, said bit also having another recess in another side for clamping cooperation with said projection when said bit is mounted in said holder in position for cutting with a different one of its cutting edges.

2. A cutting tool comprising a holder having a first bit-supporting surface, a second bit-supporting surface disposed at an angle to said first surface, a cutter bit disposed in the angle between said two bit-supporting surfaces and adapted to be turned and tilted into adjusted working positions with respect to said surfaces, said bit having a plurality of cutting edges for selective use, a clamping member located adjacent said bit, on the side thereof toward said second surface, said bit being provided with a recess in its side toward said clamp, said clamp having a projection extending into said recess angularly inwardly in the direction of said first surface, and means for pressing said clamp toward said first surface whereby said projection presses said bit toward said first bit-supporting surface, and due to its angular direction of extent, also draws said bit toward said second bit-supporting surface, said recess in said bit having a wall extending in the same angular direction as said projection, said projection bearing against said wall of said recess, said holder being provided with a third bit-supporting surface arranged at an angle to each of said two other bit-supporting surfaces, and a second clamping means pressing said bit toward said third surface, said bit also having another recess in another side for clamping cooperation with said projection when said bit is mounted in said holder in positions for cutting with a different one of its cutting edges.

References Cited by the Examiner

UNITED STATES PATENTS

| | | | |
|---|---|---|---|
| 1,361,851 | 12/1920 | Hall | 29—96 |
| 1,496,984 | 6/1924 | Felsch | 29—96 |
| 2,370,273 | 2/1945 | Ulliman. | |
| 2,805,467 | 9/1957 | Greenleaf | 29—96 |
| 2,870,523 | 1/1959 | Richard | 29—96 |

FOREIGN PATENTS

| | | |
|---|---|---|
| 569,666 | 8/1958 | Belgium. |
| 351,406 | 7/1905 | France. |
| 535,874 | 11/1955 | Italy. |

WILLIAM W. DYER, JR., *Primary Examiner.*